United States Patent
Maier et al.

[11] 3,717,629
[45] Feb. 20, 1973

[54] NITROFURAN DERIVATIVES

[75] Inventors: Roland Maier, Biberach/Riss; Robert Sauter, Laupheim, both of Germany

[73] Assignee: Boehringer Ingelheim G.m.b.H., Ingelheim am Rhein, Germany

[22] Filed: Sept. 2, 1971

[21] Appl. No.: 177,435

[30] Foreign Application Priority Data

Sept. 11, 1970 Germany ................... P 20 45 049.1
June 4, 1971 Germany ................... P 21 27 735.0

[52] U.S. Cl. ...... 260/244 R, 260/243 R, 260/246 A, 260/247.1, 260/247.5 R, 260/256.4 H, 260/256.5 R, 260/268 PC, 260/268 R, 260/268 TR, 260/293.67, 260/293.87, 260/306.7, 260/307 A, 260/309, 260/309.7, 260/310 A, 260/326.85, 260/327, 260/607 R, 424/244, 424/246, 424/248, 424/250, 424/267, 424/270, 424/272, 424/273, 424/274

[51] Int. Cl. ............................................. C07d 87/06
[58] Field of Search ........................... 260/244, 243, 246, 247.5, 247.1, 260/256.4, 256.5, 268, 307, 309, 306.7, 306.7, 293.67, 310

[56] References Cited

UNITED STATES PATENTS

2,394,068  2/1946  Kendall et al. ..................... 260/310

*Primary Examiner*—Harry I. Moatz
*Attorney*—Hammond & Littell

[57] ABSTRACT

Compounds of the formula

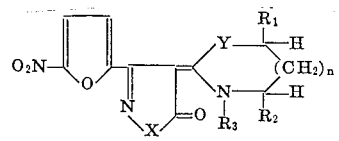

wherein $R_1$ is hydrogen, straight or branched alkyl of one to six carbon atoms, monohydroxy-(alkyl of one to six carbon atoms), or

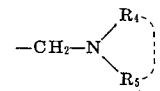

where $R_4$ and $R_5$ are each straight or branched alkyl of one to four carbon atoms, or, together with each other nd the nitrogen atom to which they are attached, morpholino, pyrrolidino, piperidino or N'-methyl-piperazino, $R_2$ is hydrogen or alkyl of one to three carbon atoms, $R_3$ is hydrogen, straight or branched alkyl of one to five carbon atoms, or monohydroxy-(alkyl of one to five carbon atoms), X is oxygen, imino(—NH—) or methylimino(—NCH$_3$), Y is oxygen, sulfur or imino, and $n$ is 0 or 1, and, to the extent ahta they contain one or more basic nitrogen atoms, non-toxic acid addition salts thereof; the compounds a well as the salts are useful as bactericidal agents against grampositive and gramnegative bacteria and against trichomonas.

10 Claims, No Drawings

NITROFURAN DERIVATIVES

This invention relates to novel nitrofuran derivatives and a method of preparing these compounds.

More particularly, the present invention relates to a novel class of compounds represented by the formula $$O_2N-\text{furan}-C(Y-H)(CH_2)_n-N(R_3)-C(R_2)(H)- \quad (I)$$

wherein $R_1$ is hydrogen, straight or branched alkyl of one to six carbon atoms, monohydroxy-(alkyl of one to six carbon atoms), or $$-CH_2-N\begin{pmatrix}R_4\\R_5\end{pmatrix}$$

where $R_4$ and $R_5$ are each straight or branched alkyl of one to four carbon atoms, or, together with each other and the nitrogen atom to which they are attached, morpholino, pyrrolidino, piperidino or N'-methyl-piperazino, $R_2$ is hydrogen or alkyl of one to three carbon atoms, $R_3$ is hydrogen, straight or branched alkyl of one to five carbon atoms, or monohydroxy-(alkyl of one to five carbon atoms), X is oxygen, imino(—NH—) or methylimino(—$NCH_3$—), Y is oxygen, sulfur or imino, and $n$ is 0 or 1, and, to the extent that they contain one or more basic nitrogen atoms, non-toxic, pharmacologically acceptable acid addition salts thereof.

The compounds embraced by Formula I above may be prepared by a number of different methods involving well known chemical principles, among which the following method has proved to be particularly convenient and efficient:

By reacting a compound of the formula $$O_2N-\text{furan}-C(SR_6)(SR_7)-... \quad (II)$$

wherein X has the same meanings as in Formula I, and
$R_5$ and $R_6$ are each alkyl or, together with each other, alkylene, with an amine of the formula $$HY-CH(R_1)-(CH_2)_n-CH(R_2)-NHR_3 \quad (III)$$

wherein $R_1$, $R_2$, $R_3$, Y and n have the same meanings as in Formula I.

The reaction is preferably carried out in the presence of an inert organic solvent or suspension medium at a temperature between 20° C. and 150° C. Examples of particularly suitable solvent and suspension media are polar organic liquids, such as alkanols, dioxane, alkanones, dimethylformamide or dimethylsulfoxide.

The intermediate compound formed by the reaction, of the formula $$O_2N-\text{furan}-C(SR_6)=N-CH(R_3)(R_2)-(CH_2)_n-CH(R_1)-YH \quad (IV)$$

wherein $R_1$, $R_2$, $R_3$, X, Y and n have the same meanings as in Formula I and $R_6$ has the same meaning as in Formula II, may optionally be isolated and subsequently converted into the corresponding compound of the Formula I, for instance, by heating to a temperature between 100° C. and 200° C. in the presence of a polar organic solvent, such as dimethylsulfoxide.

In those instances where the above-described method yields a compound of the Formula I which comprises one or more basic nitrogen atoms, the basic compound may, if desired, be converted into an acid addition salt thereof by conventional procedures. Examples of non-toxic, pharmacologically acceptable acid addition salts are those formed with hydrochloric acid, hydrobromic acid, sulfuric acid, phosphoric acid, acetic acid, tartaric acid, citric acid, fumaric acid, 8-chlorotheophylline or the like.

The starting compounds of the Formula II may be prepared by nitrating a compound of the formula $$\text{furan}-C(SR_6)(SR_7)-... \quad (V)$$

wherein X, $R_6$ and $R_7$ have the meanings previously defined.

A compound of the formula V wherein $R_6$ and $R_7$ are alkyl, in turn, may be prepared by reacting a furan derivative of the formula $$\text{furan derivative} \quad (VI)$$

wherein X has the meanings previously defined, with carbon disulfide in the presence of a strong base, followed by alkylation of the dithio compound formed thereby.

Finally, those compounds of the formula V wherein $R_6$ and $R_7$ together form an alkylene chain linking the two sulfur atoms may be prepared by subjecting a compound of the formula VI to a condensation reaction with a trithiocarboxonium salt of the formula $$\left[R_8-S-C^{(+)}(S-A-S)\right] Z^{(-)} \quad (VII)$$

wherein $R_8$ is alkyl, A is alkylene, and Z is an anion.

The trithiocarboxonium salts of the Formula VII, in turn, are accessible by alkylation of a cyclic trithiocarbonate with a dialkylsulfate, for example.

3

The following examples further illustrate the present invention and will enable others skilled in the art to understand it more completely. It should be understood, however, that the invention is not limited solely to the particular examples given below.

PREPARATION OF STARTING MATERIALS

EXAMPLE A 3-(Furyl-2')-4-[(bis-methylmercapto)-methylene]-isoxazolone-5

7.9 gm (0.18 mol) of 55 percent sodium hydride were deoiled by decantation with petroleum ether and then suspended in 100 cc of dimethylsulfoxide. While exteriorly cooling the suspension with ice, a solution of 13.5 gm (0.09 mol) of 3-(furyl-2')-isoxazolone-5 and 6.9 gm (0.09 mol) of carbon disulfide in 50 cc of dimethylsulfoxide was slowly added dropwise thereto, and then the mixture was stirred for 30 minutes. Thereafter, while thoroughly cooling, 25.6 gm (0.18 mol) of methyl iodide were added dropwise, and then the resulting mixture was heated for 30 minutes at 50° – 60° C. Subsequently, after cooling, the reaction mixture was poured over ice, and the aqueous mixture was extracted with ethyl acetate. The organic phase was dried over sodium sulfate, and the ethyl acetate was evaporated, leaving a red oil which crystallized upon addition of a little ether. 12 gm (53% of theory) of yellow crystalline 3-(furyl-2')-4-[(bis-methylmercapto)-methylene]-isoxazolone-5, m. p. 86° C., of the formula

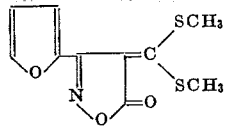

were obtained.

Using an analogous procedure, the following additional starting compounds of the Formula V were prepared:

a. 3-(Furyl-2')-4-[(bis-methylmercapto)-methylene]-pyrazolone-5, a red crystalline substance, m. p. 148° C., of the formula

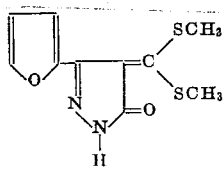

from 3-(furyl-2')-pyrazolone-5.

b. 3-(Furyl-2')-4-[(bis-methylmercapto)-methylene]-1-methyl-pyrazolone-5, a yellow crystalline substance, m. p. 83° C., from 3-(furyl-2')-1-methyl-pyrazolone-5 (m. p. 193° C.); the latter, in turn, was prepared from ethyl furoylacetate and N-methyl-hydrazine.

EXAMPLE B 3-(Furyl-2')-4-[1'',3''-dithiacyclopentanylidene-2'']-isoxazolone-5

12.1 gm (0.08 mol) of 3-(furyl-2')-isoxazolone-5 and 42 gm (0.16 mol) of 2-methylmercapto-1,3-dithiolaniummethylsulfate (prepared by heating a mixture of equimolar amounts of ethylene trithiocarbonate and dimethylsulfate on a water bath) were dissolved in 100 cc of pyridine, a solution of 16.2 gm (0.16 mol) of triethylamine in 100 cc of pyridine was added, and the mixed solution was heated for 3 hours at 70° C. Thereafter, the pyridine was drawn off in vacuo, the residue was admixed with water, and the crystalline substance formed thereby was collected by vacuum filtration and recrystallized from ethanol. 8.6 gm (42.3% of theory) of the faintly yellow crystalline compound, m. p. 160° – 162° C., of the formula

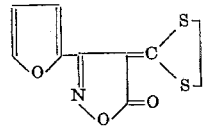

obtained.

Analysis: $C_{10}H_{17}NO_3S_2$; mol. wt. 253.3
Calculated: C-47.41% H-2.78% N-5.53% S-25.32%
Found: C-47.40% H-2.94% N-5.51% S-25.05% a. Using an analogous procedure, 3-(furyl-2')-4-[3''-methyl-thiazolidinylidene-2'']-isoxazolone-5, m. p. 128° C. (from isopropanol), was prepared from 3-(furyl-2')-isoxazolone-5 and 3-methyl-2-methylmercapto-thiazolidiniummethosulfate; the latter was, in turn, prepared from 2-methylmercapto-Δ2-thiazoline and dimethylsulfate.

EXAMPLE C 3-(5'-Nitro-furyl-2')-4-[(bis-methylmercapto)-methylene]-isoxazolone-5

2.55 gm (0.01 mol) of 3-(furyl-2')-4-[(bis-methylmercapto)-methylene]-isoxazolone-5 were dissolved in concentrated sulfuric acid, the resulting solution was cooled to −20° C., and then 0.85 gm (0.01 mol) of sodium nitrate was added in small portions. Thereafter, the reaction mixture was allowed to stand at room temperature overnight and was then poured over ice. The precipitate formed thereby was collected and recrystallized from ethyl acetate, yielding 1.2 gm (40% of theory) of the yellowish-orange crystalline compound, m. p. 162° C., of the formula

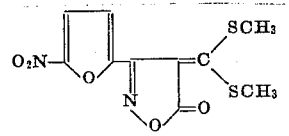

Analysis: $C_{10}H_8N_2O_5S_2$; mol. wt. 300.32
Calculated: C-40.00% H-2.69% N-9.33% S-21.35%
Found: C-39.80% H-2.76% N-9.35% S-21.45%

Using an analogous procedure, the following additional starting compounds of the Formula II were prepared:

a. 3-(5'-Nitro-furyl-2')-4-[(bis-methylmercapto)-methylene]-pyrazolone-5, reddish-brown crystals, m. p. 164° C., from 3-(furyl-2')-4-[(bis-methylmercapto)-methylene]-pyrazolone-5.

b. 3-(5'-Nitro-furyl-2')-4-[(bis-methylmercapto)-methylene]-1-methyl-pyrazolone-5, yellow crystals, m. p. 200° C., from 3-(furyl-2')-4-[(bis-methylmercapto)-methylene]-1-methyl-pyrazolone-5.

c. 3-(5'-Nitro-furyl-2')-4-[1'',3''-dithiacyclopentanylidene-2'']-isoxazolone-5, brown crystals, m. p. 188° C. (from dimethylformamide/water), from 3-(furyl-2')-4-[1'',3''-dithiacyclopentanylidene-2'']-isoxazolone-5.

EXAMPLE D

3-Morpholino-2-hydroxy-n-propylamine

A mixture consisting of 69.5 gm (0.29 mol) of 3-chloro-2-hydroxy-n-propyl-phthalimide (see Berichte Deutsch Chem. Ges. 50, 280), 53.2 gm (0.61 mol) of morpholine and 170 cc of ethanol was heated at its boiling point for 6 hours. Thereafter, the ethanol was evaporated, the residue was boiled for 3 hours with 600 cc of aqueous 20% hydrochloric acid, the mixture was allowed to cool and was then vacuum-filtered, the filtrate was concentrated by evaporation to 150 cc, and the concentrate was made strongly alkaline with solid caustic alkali. The oil precipitated thereby was taken up in benzene, and the aqueous phase was extracted twice with benzene. The combined benzene phases were dried over sodium sulfate and then fractionally distilled in vacuo, yielding 17.2 gm of the oily compound, b. p. 146°–148° C. at 12 mm Hg, of the formula

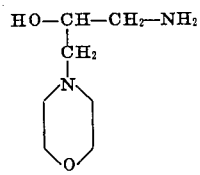

Using an analogous procedure, the following additional starting compounds of the Formula III were prepared:

a. 3-Piperidino-2-hydroxy-n-propylamine, a colorless oil, b. p. 128°–129° C. at 12 mm Hg, from 3-chloro-2-hydroxy-n-propyl-phthalimide and piperidine.
b. 3-Pyrrolidino-2-hydroxy-n-propylamine, a colorless oil, b. p. 120°–121° C. at 12 mm Hg, from 3-chloro-2-hydroxy-n-propyl-phthalimide and pyrrolidine.
c. 3-(N'-Methyl-piperazino)-2-hydroxy-n-propylamine, an oil, b. p. 116°–118° C. at 0.2 mm Hg, from 3-chloro-2-hydroxy-n-propyl-phthalimide and N-methyl-piperazine.
d. 3-(Di-n-butylamino)-2-hydroxy-n-propylamine, a colorless oil, b. p. 101° C. at 0.3 mm Hg, from 3-chloro-2-hydroxy-n-propyl-phthalimide and di-n-butylamine.
e. 3-(Di-isopropylamino)-2-hydroxy-n-propylamine, a colorless oil, b. p. 95° C. at 0.01 mm Hg, from 3-chloro-2-hydroxy-n-propylphthalimide and diisopropylamine.

PREPARATION OF END PRODUCTS

EXAMPLE 1

3-(5'-Nitro-furyl-2')-4-[oxazolidinylidene-2'']-isoxazolone-5

A mixture consisting of 2 gm (0.0066 mol) of 3-(5'-nitro-furyl-2')-4-[(bis-methylmercapto)-methylene]-isoxazolone-5, 0.41 gm (0.0066 mol) of ethanolamine and 30 cc of acetone was heated at its boiling point for 1 hour. Thereafter, the reaction mixture was allowed to cool, and the precipitate formed thereby was collected by vacuum filtration and washed several times with acetone. 1.4 gm (80% of theory) of the yellowish-crystalline compound, m. p. 263° C. (decomp.), of the formula

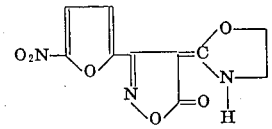

were obtained.

Analysis: $C_{10}H_7N_3O_6$; mol. wt. 265.19
Calculated: C-45.25%; H-2.66%; N-15.87%
Found: C-45.40%; H-2.74%; N-15.70%

EXAMPLE 2

Using a procedure analogous to that described in Example 1, 3-(5'-nitro-furyl-2')-4-[imidazolidinylidene-2'']-isoxazolone-5, m. p. 280° C. (decomp.; recrystallized from dioxane), of the formula

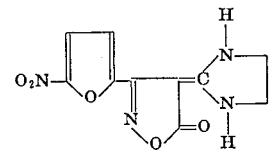

was prepared from 3-(5'-nitro-furyl-2')-4-[(bis-methylmercapto)-methylene]-isoxazolone-5 and ethylenediamine.

EXAMPLE 3

Using a procedure analogous to that described in Example 1, 3-(5'-nitro-furyl-2')-4-[1'''-(β-hydroxyethyl)-imidazolidinylidene-2'']-isoxazolone-5, m. p. 226° C. (decomp.), of the formula

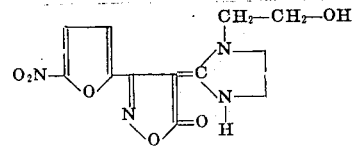

was prepared from 3-(5'-nitro-furyl-2')-4-[(bis-methylmercapto)-methylene]-isoxazolone-5 and N-(β-hydroxy-ethyl)-ethylenediamine.

EXAMPLE 4

Using a procedure analogous to that described in Example 1, 3-(5'-nitro-furyl-2')-4-[3''-(β-hydroxyethyl)-oxazolidinylidene-2'']-isoxazolone-5, m. p. 150° C. (recrystallized from methanol), of the formula

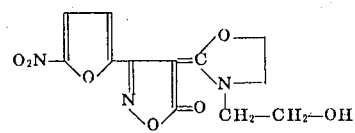

was prepared from 3-(5'-nitro-furyl-2')-4-[(bis-methylmercapto)-methylene]-isoxazolone-5 and diethanolamine.

EXAMPLE 5

Using a procedure analogous to that described in Example 1, 3-(5'-nitro-furyl-2')-4-[1'''-methyl-imidazolidinylidene-2'']-isoxazolone-5, m. p. 238° C. (decomp.), of the formula

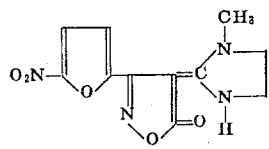

was prepared from 3-(5'-nitro-furyl-2')-4-[(bis-methylmercapto)-methylene]-isoxazolone-5 and N-methyl-ethylenediamine.

EXAMPLE 6

Using a procedure analogous to that described in Example 1, 3-(5'-nitro-furyl-2')-4-[3'''-methyl-oxazolidinylidene-2'']-isoxazolone-5, m. p. 205° C. (recrystallized from ethylacetate/acetone), of the formula

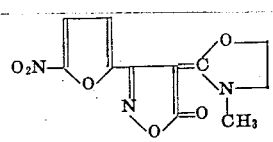

was prepared from 3-(5'-nitro-furyl-2')-4-[(bis-methylmercapto)-methylene]-isoxazolone-5 and N-methyl-ethanolamine.

EXAMPLE 7

Using a procedure analogous to that described in Example 1, 3-(5'-nitro-furyl-2')-4-[thiazolidinylidene-2'']-isoxazolone-5, m. p. 210° C., of the formula

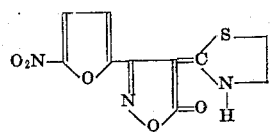

was prepared from 3-(5'-nitro-furyl-2')-4-[(bis-methylmercapto)-methylene]-isoxazolone-5 and cysteamine.

EXAMPLE 8

Using a procedure analogous to that described in Example 1, 3-(5'-nitro-furyl-2')-4-[4''',5'''-dimethyl-oxazolidinylidene-2'']-isoxazolone-5, m. p. 251° C., of the formula

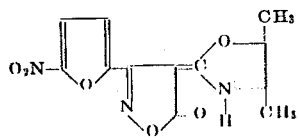

was prepared from 3-(5'-nitro-furyl-2')-4-[(bis-methylmercapto)-methylene]-isoxazolone-5 and 2-amino-3-hydroxy-n-butane.

EXAMPLE 9

Using a procedure analogous to that described in Example 1, 3-(5'-nitro-furyl-2')-4-[5'''-methyl-oxazolidinylidene-2'']-isoxazolone-5, m. p. 253° C., of the formula

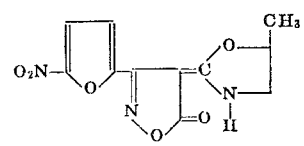

was prepared from 3-(5'-nitro-furyl-2')-4-[(bis-methylmercapto)-methylene]-isoxazolone-5 and 1-amino-2-hydroxy-n-propane.

EXAMPLE 10

Using a procedure analogous to that described in Example 1, 3-(5'-nitro-furyl-2')-4-[4'''-methyl-oxazolidinylidene-2'']-isoxazolone-5, m. p. 280° C., of the formula

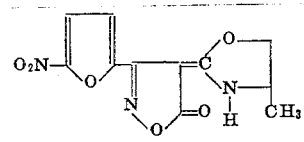

was prepared from 3-(5'-nitro-furyl-2')-4-[(bis-methylmercapto)-methylene]-isoxazolone-5 and 2-amino-1-hydroxy-n-propane.

EXAMPLE 11

Using a procedure analogous to that described in Example 1, 3-(5'-nitro-furyl-2')-4-[1''',3'''-tetrahydrooxazolinylidene-2'']-isoxazolone-5, m. p. 273° C., of the formula

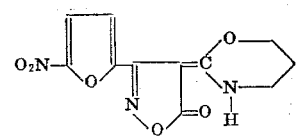

was prepared from 3-(5'-nitro-furyl-2')-4-[(bis-methylmercapto)-methylene]-isoxazolone-5 and 1-amino-3-hydroxy-n-propane.

EXAMPLE 12

Using a procedure analogous to that described in Example 1, 3-(5'-nitro-furyl-2')-4-[5'''-hydroxymethyloxazolidinylidene-2'']-isoxazolone-5, m. p. 225° C. (decomp.), of the formula

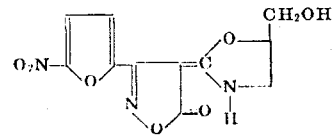

was prepared from 3-(5'-nitro-furyl-2')-4-[(bis-methylmercapto)-methylene]-isoxazolone-5 and 1-amino-2,3-dihydroxy-n-propane.

EXAMPLE 13

Using a procedure analogous to that described in Example 1, 3-(5'-nitro-furyl-2')-4-[5''-isopropyl-oxazolidinylidene-2'']-isoxazolone-5, m.p. 185° C. (recrystallized from ethanol), of the formula

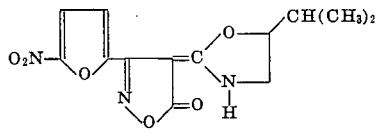

was prepared from 3-(5'-nitro-furyl-2')-4-[(bis-methylmercapto)-methylene]-isoxazolone-5 and 1-amino-2-hydroxy-3-methyl-n-butane.

EXAMPLE 14

Using a procedure analogous to that described in Example 1, 3-(5'-nitro-furyl-2')-4-[4''-methyl-5''-ethyl-oxazolidinylidene-2'']-isoxazolone-5, m.p. 230° C. (recrystallized from dioxane), of the formula

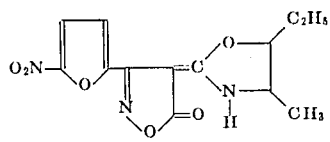

was prepared from 3-(5'-nitro-furyl-2')-4-[(bis-methylmercapto)-methylene]-isoxazolone-5 and 2-amino-3-hydroxy-n-pentane.

EXAMPLE 15

Using a procedure analogous to that described in Example 1, 3-(5'-nitro-furyl-2')-4-[5'''-isopropyl-4''-methyloxazolidinylidene-2'']-isoxazolone-5, m.p. 204° C. (recrystallized from ethanol/acetone), of the formula

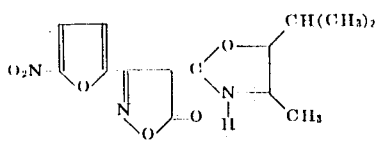

was prepared from 3-(5'-nitro-furyl-2')-4-[(bis-methylmercapto)-methylene]-isoxazolone-5 and 2-amino-3-hydroxy-4-methyl-n-pentane.

EXAMPLE 16

Using a procedure analogous to that described in Example 1, 3-(5'-nitro-furyl-2')-4-[1''-ethyl-imidazolidinylidene-2'']-isoxazolone-5, m.p. 235° C. (decomp.), of the formula

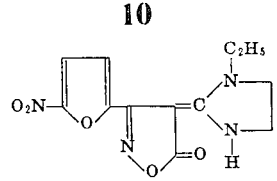

was prepared from 3-(5'-nitro-furyl-2')-4-[(bis-methylmercapto)-methylene]-isoxazolone-5 and N-ethyl-ethylene-diamine.

EXAMPLE 17

Using a procedure analogous to that described in Example 1, 3-(5'-nitro-furyl-2')-4-[3''-ethyl-oxazolidinylidene-2'']-isoxazolone-5, m.p. 166° C. (recrystallized from ethanol), of the formula

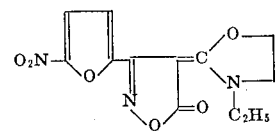

was prepared from 3-(5'-nitro-furyl-2')-4-[(bis-methylmercapto)-methylene]-isoxazolone-5 and N-ethyl-ethanolamine.

EXAMPLE 18

Using a procedure analogous to that described in Example 1, 3-(5'-nitro-furyl-2')-4-[hexahydropyrimidinylidene-2'']-isoxazolone-5, m.p. 243° C. (decomp.), of the formula

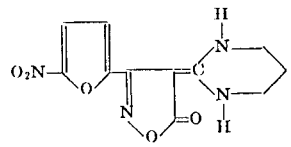

was prepared from 3-(5'-nitro-furyl-2')-4-[(bis-methylmercapto)-methylene]-isoxazolone-5 and 1,3-diamino-n-propane.

EXAMPLE 19

Using a procedure analogous to that described in Example 1, 3-(5'-nitro-furyl-2')-4-[5''-n-hexyl-oxazolidinylidene-2'']-isoxazolone-5, m. p. 135° C. (recrystallized from ethanol), of the formula

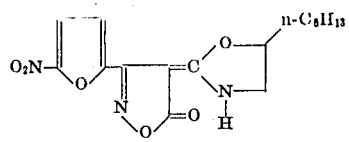

was prepared from 3-(5'-nitro-furyl-2')-4-[(bis-methylmercapto)-methylene]-isoxazolone-5 and 1-amino-2-hydroxy-n-octane.

EXAMPLE 20

Using a procedure analogous to that described in Example 1, 3-(5'-nitro-furyl-2')-4-[5''-n-pentyl-oxazolidinylidene-2''}-isoxazolone-5, m. p. 165° C., of the formula

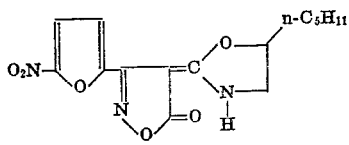

was prepared from 3-(5'-nitro-furyl-2')-4-[(bis-methylmercapto)-methylene]-isoxazolone-5 and 1-amino-2-hydroxy-n-heptane.

EXAMPLE 21

Using a procedure analogous to that described in Example 1, 3-(5'-nitro-furyl-2')-4-[4''-ethyl-5''-methyloxazolidinylidene-2'']-isoxazolone-5, m. p. 222° C., of the formula

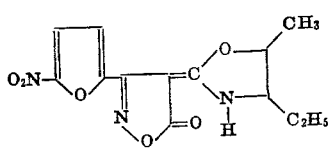

was prepared from 3-(5'-nitro-furyl-2')-4-[(bis-methylmercapto)-methylene]-isoxazolone-5 and 3-amino-2-hydroxy-n-pentane.

EXAMPLE 22

Using a procedure analogous to that described in Example 1, 3-(5'-nitro-furyl-2')-4-[4''-ethyl-oxazolidinylidene-2'']-isoxazolone-5, m. p. 246° C., of the formula

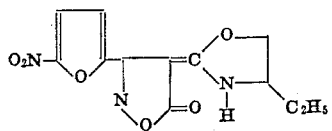

was prepared from 3-(5'-nitro-furyl-2')-4-[(bis-methylmercapto)-methylene]-isoxazolone-5 and 2-amino-1-hydroxy-n-butane.

EXAMPLE 23

Using a procedure analogous to that described in Example 1, 3-(5'-nitro-furyl-2')-4-[1'''-methyl-hexahydropyrimidinylidene-2'']-isoxazolone-5, m. p. 225° C. (decomp.), of the formula

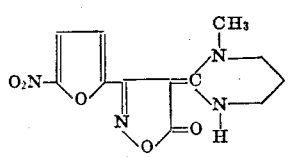

was prepared from 3-(5'-nitro-furyl-2')-4-[(bis-methylmercapto)-methylene]-isoxazolone-5 and N-methyl-1,3-diamino-n-propane.

EXAMPLE 24

Using a procedure analogous to that described in Example 1, 3-(5'-nitro-furyl-2')-4-[3''-(β-hydroxy-ethyl)-thiazolidinylidene-2'']-isoxazolone-5, m. p. 188° C. (decomp.), of the formula

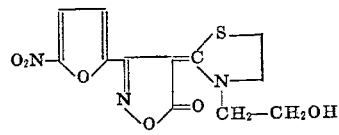

was prepared from 3-(5'-nitro-furyl-2')-4-[(bis-methylmercapto)-methylene]-isoxazolone-5 and N-(β-hydroxy-ethyl)-cysteamine.

EXAMPLE 25

Using a procedure analogous to that described in Example 1, 3-(5'-nitro-furyl-2')-4-[3''-(β-hydroxy-n-propyl)-5''-methyl-oxazolidinylidene-2'']-isoxazolone-5, m. p. 130° C. (recrystallized from isopropanol), of the formula

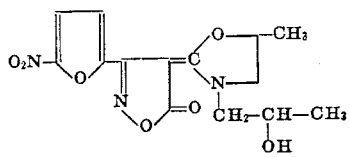

was prepared from 3-(5'-nitro-furyl-2')-4-[(bis-methylmercapto)-methylene]-isoxazolone-5 and di-(β-hydroxy-n-propyl)-amine.

EXAMPLE 26

Using a procedure analogous to that described in Example 1, 3-(5'-nitro-furyl-2')-4-[3''-n-butyl-oxazolidinylidene-2'']-isoxazolone-5, m. p. 110° C. (recrystallized from ethanol), of the formula

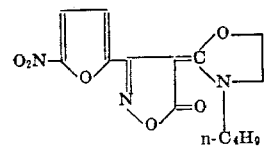

was prepared from 3-(5'-nitro-furyl-2')-4-[(bis-methylmercapto)-methylene]-isoxazolone-5 and N-n-butyl-ethanolamine.

EXAMPLE 27

Using a procedure analogous to that described in Example 1, 3-(5'-nitro-furyl-2')-4-[1'''-n-propyl-imidazolidinylidene-2'']-isoxazolone-5, m. p. 200° C. (recrystallized from dioxane), of the formula

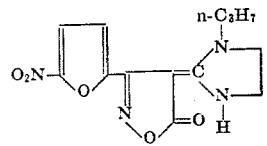

was prepared from 3-(5'-nitro-furyl-2')-4-[(bis-methylmercapto)-methylene]-isoxazolone-5 and N-n-propyl-ethylenediamine.

EXAMPLE 28

Using a procedure analogous to that described in Example 1, 3-(5'-nitro-furyl-2')-4-[3''-(β-hydroxy-n-propyl)-oxazolindylidene-2'']-isoxazolone-5, m. p. 153° C. (recrystallized from ethanol), of the formula

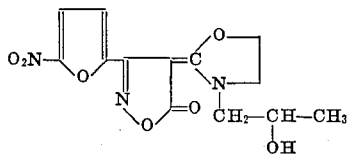

was prepared from 3-(5'-nitro-furyl-2')-4-[(bis-methylmercapto)-methylene]-isoxazolone-5 and N-(β-hydroxy-n-propyl)-ethanolamine.

EXAMPLE 29

Using a procedure analogous to that described in Example 1, 3-(5'-nitro-furyl-2')-4-[3''-(γ-hydroxy-n-propyl)-oxazolidinylidene-2'']-isoxazolone-5, m. p. 185° C. (recrystallized from ethanol), of the formula

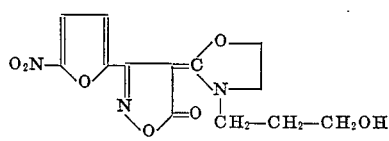

was prepared from 3-(5'-nitro-furyl-2')-4-[(bis-methylmercapto)-methylene]-isoxazolone-5 and N-(γ-hydroxy-n-propyl)-ethanolamine.

EXAMPLE 30

Using a procedure analogous to that described in Example 1, 3-(5'-nitro-furyl-2')-4-[3''-(β-methyl-n-butyl)-oxazolidinylidene-2'']-isoxazolone-5, m. p. 140° C. (recrystallized from ethanol), of the formula

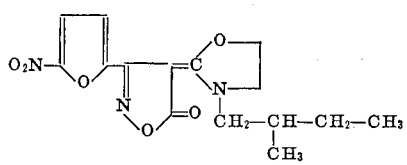

was prepared from 3-(5'-nitro-furyl-2')-4-[(bis-methylmercapto)-methylene]-isoxazolone-5 and N-(β-methyl-n-butyl)-ethanolamine.

EXAMPLE 31

Using a procedure analogous to that described in Example 1, 3-(5'-nitro-furyl-2')-4-[3'',5''-dimethyl-oxazolidinylidene-2'']-isoxazolone-5, m. p. 196° C., of the formula

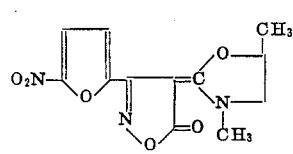

was prepared from 3-(5'-nitro-furyl-2')-4-[(bis-methylmercapto)-methylene]-isoxazolone-5 and 1-methylamino-2-hydroxy-propane.

EXAMPLE 32

Using a procedure analogous to that described in Example 1, 3-(5'-nitro-furyl-2')-4-[3''-isopropyl-oxazolidinylidene-2'']-isoxazolone-5, m. p. 198° C., of the formula

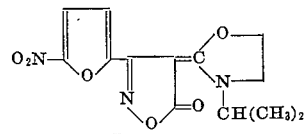

was prepared from 3-(5'-nitro-furyl-2')-4-[(bis-methylmercapto)-methylene]-isoxazolone-5 and N-isopropyl-ethanolamine.

EXAMPLE 33

Using a procedure analogous to that described in Example 1, 3-(5'-nitro-furyl-2')-4-[imidazolidinylidene-2'']-isoxazolone-5, m. p. 275° C. (decomp.; recrystallized from dioxane), of the formula

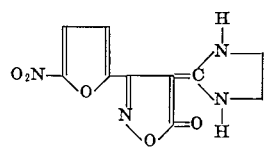

was prepared from 3-(5'-nitro-furyl-2')-4-[1'',3''-dithiacyclopentanylidene-2'']-isoxazolone-5 and ethylenediamine.

EXAMPLE 34

Using a procedure analogous to that described in Example 1, 3-(5'-nitro-furyl-2')-4-[5''-methyl-oxazolidinylidene-2'']-pyrazolone-5, m. p. 275° C. (decomp.; recrystallized from ethanol), of the formula

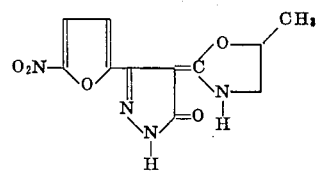

was prepared from 3-(5'-nitro-furyl-2')-4-[(bis-methylmercapto)-methylene]-pyrazolone-5 and 1-amino-2-hydroxy-n-propane.

EXAMPLE 35

Using a procedure analogous to that described in Example 1, 3-(5'-nitro-furyl-2')-4-[thiazolidinylidene-2'']-pyrazolone-5, m. p. 287° C. (recrystallized from dimethylformamide), of the formula

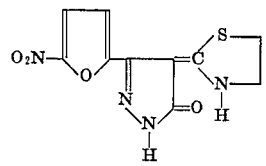

was prepared from 3-(5'-nitro-furyl-2')-4-[(bis-methylmercapto)-methylene]-pyrazolone-5 and cysteamine.

EXAMPLE 36

Using a procedure analogous to that described in Example 1, 3-(5'-nitro-furyl-2')-4-[5''-methyl-oxazolidinylidene-2'']-1-methyl-pyrazolone-5, m. p. 274°–275° C. (recrystallized from ethanol), of the formula

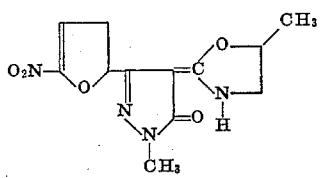

was prepared from 3-(5'-nitro-furyl-2')-4-[(bis-methylmercapto)-methylene]-1-methyl-pyrazolone-5 and 1-amino-2-hydroxy-n-propane.

EXAMPLE 37

3-(5'-Nitro-furyl-2')-4-[1'',3''-tetrahydrooxazinylidene-2'']-isoxazolone-5 a. 2.0 gm (0.0066 mol) of 3-(5'-nitro-furyl-2')-4-[(bis-methylmercapto)-methylene]-isoxazolone-5 were suspended in 30 cc of ethanol, and 0.52 gm (0.007 mol) of 3-hydroxy-n-propylamine were added to the suspension. Everything gradually went into solution, accompanied by evolution of mercaptan. After 10 minutes of standing the solution was evaporated, and the residue was recrystallized from ethanol, yielding 1.2 gm of 3-(5'-nitro-furyl-2')- 4-[(methylmercapto)-(γ-hydroxy-n-propylamino)-methylene]-isoxazolone-5, m. p. 168° C.

b. A mixture of 0.3 gm of this compound and 3 cc of dimethylsulfoxide was heated at its boiling point for 5 minutes and then allowed to cool, and the precipitate formed thereby was collected by vacuum filtration and washed with ether. 150 mgm of the same compound as in Example 11, m. p. 275°–280° C., were obtained.

EXAMPLE 38

3-(5'-Nitro-furyl-2')-4-[5''-(dimethylamino-methyl)-oxazolidinylidene-2'']-isoxazolone-5

11.8 gm (0.04 mol) of 3-(5'-nitro-furyl-2')-4-[(bis-methylmercapto)-methylene]-isoxazolone-5 were suspended in 150 cc of ethanol, and 4.83 gm (0.04 mol) of 3-dimethylamino-2-hydroxy-n-propylamine (prepared according to Friedlander 16, 2896) were added to the suspension. The resulting mixture was heated at its boiling point for 1 hour, then allowed to cool, vacuum-filtered, and the filter cake was washed with ethanol and ether. 10 gm (80% of theory) of the compound, m. p. 192° C., of the formula

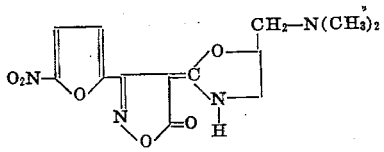

were obtained.

Analysis: $C_{13}H_{14}N_4O_6$; mol. wt. 322.3
Calculated: C-48.45%; H-4.38%; N-17.37%
Found: C-48.50%; H-4.43%; N-17.40%

Its hydrochloride, obtained by treating the free base with hydrochloric acid, had a melting point of 251°–253° C.

Its tartrate, obtained by treating the free base with tartaric acid, had a melting point of 160°–165° C.

EXAMPLE 39

Using a procedure analogous to that described in Example 38, 3-(5'-nitro-furyl-2')-4-([5''-(diethylaminomethyl)-oxazolidinylidene-2'']-isoxazolone-5, m. p. 204° C., of the formula

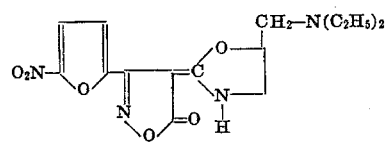

was prepared from 3-(5'-nitro-furyl-2'-)4-[(bis-methylmercapto)-methylene]-isoxazolone-5 and 3-diethylamino-2-hydroxy-n-propylamine.

EXAMPLE 40

Using a procedure analogous to that described in Example 38, 3-(5'-nitro-furyl-2'-(4-(5''-(piperidino-methyl)-oxazolidinylidene-2'']-isoxazolone-5, m. p. 194° C., of the formula

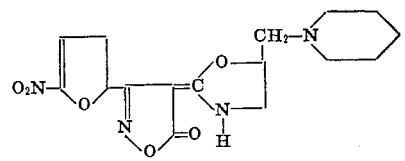

was prepared from 3-(5'-nitro-furyl-2'-4-[(bis-methylmercapto)-methylene]-isoxazolone-5 and 3-piperidino-2-hydroxy-n-propylamine.

EXAMPLE 41

Using a procedure analogous to that described in Example 38, 3-(5'-nitro-furyl-2')-4-[5''-(pyrrolidino-methyl)-oxazolidinylidene 2'']-isoxazolone-5, m.p. 205° C., of the formula

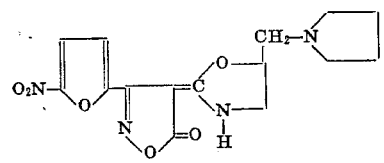

was prepared from 3-(5'-nitro-furyl-2')-4-[(bis-methylmercapto)-methylene]-isoxazolone-5 and 3-pyrrolidino-2-hydroxy-n-propylamine.

EXAMPLE 42

Using a procedure analogous to that described in Example 38, 3-(5'-nitro-furyl-2')-4-[5''-(N'-methyl-piperazinomethyl)-oxazolidinylidene-2'']-isoxazolone-5, m.p. 146° C, of the formula

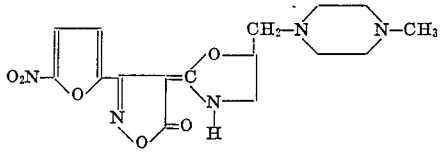

was prepared from 3-(5'-nitro-furyl-2')-4-[(bis-methylmercapto)-methylene]-isoxazolone-5 and 3-(N'-methylpiperazino)-2-hydroxy-n-propylamine.

EXAMPLE 43

Using a procedure analogous to that described in Example 38, 3-(5'-nitro-furyl-2')-4-[5''-(morpholino-methyl)-oxazolidinylidene-2'']-isoxazolone-5. m.p. 220° C. of the formula

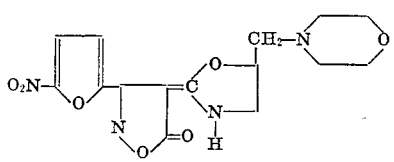

was prepared from 3-(5'-nitro-furyl-2')-4-[(bis-methylmercapto)-methylene]-isoxazolone-5 and 3-morpholino-2-hydroxy-n-propylamine.

EXAMPLE 44

Using a procedure analogous to that described in Example 38, 3-(5'-nitro-furyl-2')-4-(5''-(di-n-butylaminomethyl)-oxazolidinylidene-2'']-isoxazolone-5, m.p. 142° C., of the formula

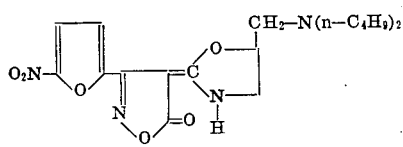

was prepared from 3-(5'-nitro-furyl-2')-4-[(bis-methylmercapto)-methylene]-isoxazolone-5 and 3-(di-n-butylamino)-2-hydroxy-n-propylamine.

EXAMPLE 45

Using a procedure analogous to that described in Example 38, 3-(5'-nitro-furyl-2')-4-[5''-(di-isopropylaminomethyl)-oxazolidinylidene-2'']-isoxazolone-5, m.p. 183°C., of the formula

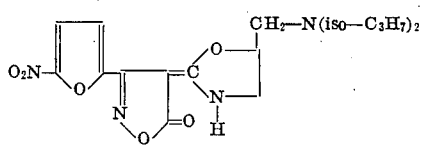

was prepared from 3-(5'-nitro-furyl-2')-4-[(bis-methylmercapto)-methylene]-isoxazolone-5 and 3-(di-isopropylamino)-2-hydroxy-n-propylamine.

EXAMPLE 46

Using a procedure analogous to that described in Example 38, 3-(5'-nitro-furyl-2')-4-[5''(dimethylamino-methyl)-3-methyl-oxazolidinylidene-2'']-isoxazolone-5, m.p. 96° C., of the formula

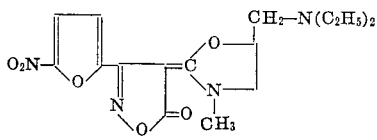

was prepared from 3-(5'-nitro-furyl-2')-4-[(bis-methylmercapto)-methylene]-isoxazolone-5 and 3-diethylamino-2-hydroxy-N-methyl-n-propylamine.

EXAMPLE 47

Using a procedure analogous to that described in Example 38, 3-(5'-nitro-furyl-2')-4-[5''-(dimethylamino-methyl)-oxazolidinylidene-2'']-isoxazolone-5, m.p. 192° C., was prepared from 3-(5'-nitro-furyl-2')-4-[1'',3-dithiacyclo-pentanylidene)-2'']-isoxazolone-5 and 3-dimethylamino-2-hydroxy-n-propylamine.

The compounds according to the present invention, that is, those embraced by formula I above and, if they contain a basic nitrogen atom, non-toxic acid addition salts thereof, have useful pharmacodynamic properties. More particularly, the compounds of the instant invention exhibit anti-bacterial activities and are especially effective against grampositive and gramnegative bacteria, such as *Staphylococcus aureus* and *Escherichia coli*, as well as against trichomonads, especially *Trichomonas vaginalis*.

For instance, the following specific compounds are effective against *Staphylococcus aureus* and *Escherichia coli* within concentration ranges as low as 0.6–20 γ/ml and 0.16–20 γ/ml, respectively:

A. 3-(5'-Nitro-furyl-2')-4-[imidazolidinylidene-2'']-isoxazolone-5,
B. 3-(5'-Nitro-furyl-2')-4-[oxazolidinylidene-2'']-isoxazolone-5,
C. 3-(5'-Nitro-furyl-2')-4-([3''-methyl-oxazolidinylidene-2'']-isoxazolone-5,
D. 3-(5'-nitro-furyl-2')-4-[thiazolidinylidene-2''-isoxazolone-5,
E. 3-(5'-Nitro-furyl-2')-4-[5''-methyl-oxazolidinylidene-2'']-isoxazolone-5,
F. 3-(5'-Nitro-furyl-2')-4-[4''-methyl-oxazolidinylidene-2'']-isoxazolone-5,
G. 3-(5'-Nitro-furyl-2')-4-[3''-(β-hydroxy-ethyl)-oxazolidinylidene-2'']-isoxazolone-5,
H. 3-(5'-Nitro-furyl-2')-4-[1'',3''-tetrahydroox-azinylidene-2'']-isoxazolone-5, and
I. 3-(5'-Nitro-furyl-2')-4-[5''-(dimethylamino-methyl)-oxazolidinylidene-2'']-isoxazolone-5.

Compounds (B), (D), (E) and (F) are also very effective against *Trichomonas vaginalis* at minimum inhibiting concentrations below 0.2 γ/ml. pharmaceutical purposes the compounds according to the present invention are administered to warm-blooded animals topically or perorally as active ingredients in customary pharmaceutical compositions, that is, compositions consisting essentially of an inert pharmaceutical carrier and an effective amount of the active ingredient, such as tablets, coated pills, capsules, wafers, powders, solutions, suspensions, emulsions, syrups, suppositories, vaginal tablets and the like. One effective peroral dosage unit of the compounds according to the present invention is from 0.167 to 2.5 mgm/kg body weight, preferably 0.83 to 1.67 mgm/kg body weight.

For topical administration, the preferred concentration is about 1% by weight, based on the total weight of the composition.

The following examples illustrate a few pharmaceutical compositions comprising a compound of the present invention as an active ingredient and represent the best modes contemplated of putting the invention into practical use. The parts are parts by weight unless otherwise specified.

EXAMPLE 48

Tablets

The tablet composition is compounded from the following ingredients:

| | |
|---|---|
| 3-(5'-Nitro-furyl-2)-4-[3''-($\beta$-hydroxy-ethyl)-oxazolidinylidene-2'']-isoxazolone-5- | 100.0 parts |
| Lactose | 63.0 " |
| Potato starch | 50.0 " |
| Polyvinylpyrrolidone | 5.0 " |
| Magnesium stearate | 2.0 " |
| tz | |
| Total | 220.0 parts |

Preparation:

The isoxazolone compound, the lactose and the potato starch are intimately admixed with each other, the mixture is moistened with an aqueous 10 percent solution of the polyvinylpyrrolidone, the moist mass is forced through a 1.5 mm-mesh screen, the resulting granulate is dried at 45°C and again passed through the screen, the dry granulate is admixed with the magnesium stearate, and the composition is compressed into 220 mgm-tablets in a conventional tablet making machine. Each tablet contains 100 mgm of the isoxazolone compound and is an oral dosage unit composition with effective anti-bacterial action.

The same result is obtained when an equal amount of 3-(5'2')-4-[5''-(dimethylamino-methyl)-oxazolidinylidene-2'']-isoxazolone-5 or a non-toxic acid addition salt thereof is substituted for 3-(5'-nitro-furyl-2')-4-[3''-($\beta$-hydroxy-ethyl)-oxazolidinylidene-2'']-isoxazolone-5.

EXAMPLE 49

Coated pills

The pill core composition is compounded from the following ingredients:

| | |
|---|---|
| 3-(5'-Nitro-furyl-2')-4-[3''-($\beta$-hydroxy-ethyl)-oxazolidinylidene-2'']-isoxazolone-5 | 50.0 parts |
| Lactose | 30.0 " |
| Corn starch | 30.0 " |
| Gelatin | 3.0 " |
| Cellulose, microcrystalline | 6.0 " |
| Magnesium stearate | 1.0 " |
| Total | 120.0 parts |

Preparation:

The isoxazolone compound, the lactose and the corn starch are intimately admixed with each other, the mixture is moistened with an aqueous 12% solution of the gelatin, the moist mass is forced through a 1.5 mm-mesh screen, the resulting granulate is dried at 45° C. and again passed through a 1.0 mm-mesh screen, the dry granulate is admixed with the cellulose and the magnesium stearate, and the composition is compressed into 120 mgm-pill cores, which are subsequently coated with a thin shell consisting essentially of a mixture of sugar and talcum, and polished with beeswax. Each coated pill contains 50 mgm of the isoxazolone compound and is an oral dosage unit composition with effective antibacterial action.

EXAMPLE 50

Vaginal tablets

The tablet composition is compounded from the following ingredients:

| | |
|---|---|
| 3-(5'-Nitro-furyl-2')-4-[3''-($\beta$-hydroxy-ethyl)-oxazolidinyl-idene-2'']-isoxazolone-5 | 100.0 parts |
| Sorbitol | 885.0 " |
| Carboxymethylcellulose, high viscosity | 10.0 " |
| Magnesium stearate | 5.0 " |
| Total | 1,000.0 parts |

Preparation:

The isoxazolone compound, the sorbitol and the carboxymethyl cellulose are intimately admixed with each other, the mixture is moistened with aqueous 50% ethanol (150 gm per 1,000 tablets), the moist mass is granulated through a 2 mm-mesh screen, the granulate is dried at 45° C. and again passed through the screen, the dry granulate is admixed with the magnesium stearate, and the composition is compressed into 1,000 mgm-tablets. Each tablet contains 100 mgm of the isoxazolone compound and is an intra-vaginal dosage unit composition with effective anti-trichomonal action.

EXAMPLE 51

Tincture

The tincture is compounded from the following ingredients:

| | |
|---|---|
| 3-(5'-Nitro-furyl-2')-4-[3''-($\beta$-hydroxy-ethyl)-oxazolidinyl idene-2'']-isoxazolone-5 | 1.0 parts |
| Polyethyleneglycol 400 | 99.0 " |

| | |
|---|---|
| Total | 100.0 parts |

Preparation:

The isoxazolone compound is dissolved in the polyethyleneglycol by heating, and the solution is cooled to room temperature and then filtered. The resulting tincture contains 1% by weight of the isoxazolone compound and is a topical composition with effective anti-bacterial action.

The same result is obtained when an equal amount of 3-(5′2′-4-[5″-(dimethylamino-methyl)-oxazolidinylidene-2″]-isoxazolone-5 or a non-toxic acid addition salt thereof is substituted for 3-(5′-nitro-furyl-2′)-4-[3″-(β-hydroxy-ethyl)-oxazolidinylidene-2″]-isoxazolone-5.

EXAMPLE 52

Lotion

The suspension is compounded from the following ingredients:

| | |
|---|---|
| 3-(5″-Nitro-furyl-2′)-4-[3″-(β-hydroxy-ethyl)-oxazolidinylidene-2″]-isoxazolone-5 | 1.0 parts |
| Sorbitan monopalmitate (Span 40) | 1.0 " |
| Polyglycol ether (Cremophor O) | 2.0 " |
| Cetyl stearyl alcohol (Lanette O) | 2.0 " |
| Spermoceti | 1.0 " |
| Decyl oleate | 5.0 " |
| Paraffin oil | 1.0 " |
| Distilled water | 87.0 " |
| Total | 100.0 parts |

Preparation:

The ingredients, except the active substance and the water, are admixed with each other, and the mixture is melted, brought to 70° C., and then emulsified into the distilled water at the same temperature. The resulting aqueous emulsion is cooled to 40° C., and the finely milled isoxazolone compound is suspended therein with the aid of an immersion homogenizer. The finished composition is then cooled to room temperature. The resulting lotion, which must be thoroughly shaken before use, contains 1% by weight of the isoxazolone compound and is a topical composition with effective anti-bacterial action.

The same result is obtained when an equal amount of 3-(5′2′)-4-[5″-(dimethylamino-methyl)-oxazolidinylidene- 2″]-isoxazolone-5 or a non-toxic acid addition salt thereof is substituted for 3-(5′-nitro-furyl-2′)-4-[3″-(β-hydroxy-ethyl)-oxazolidinylidene-2″]-isoxazolone-5.

An oral dosage unit composition comprising a compound of the instant invention may, in addition, contain one or more other active ingredients, such as a muscle-relaxant, as illustrated by the following example.

EXAMPLE 53

Coated pills

The pill core composition is compounded from the following ingredients:

| | |
|---|---|
| 3-(5′-Nitro-furyl-2′)-4-[3″-(β-hydroxy-ethyl)-oxazolidinylidene-2″]-isoxazolone-5 | 50.0 parts |
| Papaverine | 25.0 " |
| Corn starch | 32.0 " |
| Gelatin | 3.0 " |
| Cellulose, microcrystalline | 9.0 " |
| Magnesium stearate | 1.0 " |
| Total | 120.0 parts |

Preparation:

The isoxazolone compound, the papaverine and the corn starch are intimately admixed with each other, the mixture is moistened with an aqueous 12% solution of the gelatin, the moist mass is forced through a 1.5 mm-mesh screen, the resulting granulate is dried at 45° C. and again passed through a 1.0 mm-mesh screen, the dry granulate is admixed with the cellulose and the magnesium stearate, and the composition is compressed into 120 mgm-pill cores, which are subsequently coated with a thin shell consisting essentially of a mixture of sugar and talcum, and finally polished with beeswax. Each coated pill contains 50 mgm of the isoxazolone compound and 25 mgm of papaverine, and is an oral dosage unit composition with effective antibacterial an muscle-relaxing actions.

The same result is obtained when an equal amount of 3-(5′2′)4-[5″-dimethylamino-methyl)-oxazolidinylidene-2″]-isoxazolone-5 or a non-toxic acid addition salt thereof is substituted for 3-(5′-nitro-furyl-2′)-4-[3″-(β-hydroxy-ethyl)-oxazolidinylidene-2″]-isoxazolone-5.

Analogous results are obtained when any one of the other nitrofuran derivatives embraced by Formula I, or a non-toxic acid addition salt thereof, is substituted for the particular isoxazolone compound in Examples 48 to 53. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

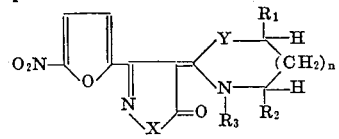

wherein $R_1$ is hydrogen, alkyl of one to six carbon atoms, monohydroxy-(alkyl of one to six carbon atoms), or

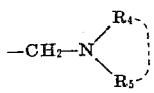

where $R_4$ and $R_5$ are each alkyl of one to four carbon atoms, or, together with each other and the nitrogen atom to which they are attached, morpholino, pyrrolidino, piperidino or N'-methyl-piperazino, $R_2$ is hydrogen or alkyl of one to three carbon atoms, $R_3$ is hydrogen, alkyl of one to five carbon atoms, or monohydroxy-(alkyl of one to five carbon atoms), X is oxygen, imino or methylimino, Y is oxygen, sulfur or imino, and $n$ is 0 or 1, or, when $R_1$ is —$CH_2$—$NR_4R_5$, as defined above, a non-toxic, pharmacologically acceptable acid addition salt thereof.

2. A compound according to claim 1, which is 3-(5'-nitro-furyl-2')-4-(imidazolidinylidene-2")-isoxazolone-5.

3. A compound according to claim 1, which is 3-(5'-nitro-furyl-2'-4-(oxazolidinylidene-2")-isoxazolone-5.

4. A compound according to claim 1, which is 3-(5'-nitro-furyl-2')-4-(3"-methyl-oxazolidinylidene-2")-isoxazolone-5.

5. A compound according to claim 1, which is 3-(5'-nitro-furyl-2')-4-thiazolidinylidene-2")-isoxazolone-5.

6. A compound according to claim 1, which is 3-(5'-nitro-furyl-2')-4-(5"-methyl-oxazolidinylidene-2")-isoxazolone-5.

7. A compound according to claim 1, which is 3-(5'-nitro-furyl-2')-4-4"-methyl-oxazolidinylidene-2")-isoxazolone-5.

8. A compound according to claim 1, which is 3-(5'-nitro-furyl-2')-4-[3"-(β-hydroxy-ethyl)-oxazolidinylidene-2"]-isoxazolone-5.

9. A compound according to claim 1, which is 3-(5'-nitro-furyl-2')-4-(1",3"2")-isoxazolone-5.

10. A compound according to claim 1, which is 3-(5'-nitro-furyl-2')-4-[5"-(dimethylamino-methyl)-oxazolidinylidene-2"]-isoxazolone-5 or a non-toxic, pharmacologically acceptable acid addition salt thereof.

* * * * *

PO-1050
(5/69)

UNITED STATES PATENT OFFICE
CERTIFICATE OF CORRECTION

Patent No. 3,717,629      Dated Feb. 20, 1973

Inventor(s) ROLAND MAIER and ROBERT SAUTER

It is certified that error appears in the above-identified patent and that said Letters Patent are hereby corrected as shown below:

Col. 16, line 25 - correct "2'-)4-" to read --2')-4- --;
"    "    "    44 - correct "2'-4-" to read --2')-4- --.

Col. 18, line 26 - correct "[1",3-" to read --[1",3"- --;
"    "    "    63 - before "pharmaceutical" insert --For--.

Col. 19, line 24 - correct "-2)-4-" to read -- -2')-4- --;
"    "    "    30 - erase "tz";
"    "    "    49 - before "2'" insert- --nitro-furyl----.

Col. 21, line 14 - correct "2'" to read---nitro-furyl-2') -;.
"    "    "    28 - correct "5" to read -- 5' --;
"    "    "    59 - before "2'" insert -- '-nitro-furyl- --.

Col. 22, line 40 - before "2'" insert -- -nitro-furyl- --.

Col. 24, line 14 - insert --(-- before "4" ";
"    "    "    21 - before "2'" insert -- -tetrahydro-oxazinylidene- --.

Signed and sealed this 9th day of April 1974.

(SEAL)
Attest:

EDWARD M.FLETCHER,JR.
Attesting Officer

C. MARSHALL DANN
Commissioner of Patents